(12) United States Patent
Kanaris

(10) Patent No.: US 7,510,073 B2
(45) Date of Patent: Mar. 31, 2009

(54) MOTORIZED DRUM ROLLER WITH STATIONARY ENDS

(75) Inventor: Alexander Kanaris, Richmond Hill (CA)

(73) Assignee: Van Der Graaf, Inc., Brampton, Ontario (CA)

( * ) Notice: Subject to any disclaimer, the term of this patent is extended or adjusted under 35 U.S.C. 154(b) by 0 days.

(21) Appl. No.: 10/791,847

(22) Filed: Mar. 4, 2004

(65) Prior Publication Data
US 2005/0109585 A1   May 26, 2005

(30) Foreign Application Priority Data
Nov. 25, 2003   (CA) .................................. 2450588

(51) Int. Cl.
*B65G 13/06* (2006.01)
(52) U.S. Cl. .................. 198/788; 198/780; 198/789; 198/832; 198/835
(58) Field of Classification Search .............. 198/780, 198/788, 789, 832, 835
See application file for complete search history.

(56) References Cited

U.S. PATENT DOCUMENTS

| | | | |
|---|---|---|---|
| 1,725,740 A | | 8/1929 | Schulte |
| 2,941,411 A | * | 6/1960 | Wilhelm et al. ............. 198/832 |
| 3,056,054 A | * | 9/1962 | Dennis ........................ 310/59 |
| 3,268,066 A | * | 8/1966 | Kishimoto ................... 198/833 |
| 3,599,769 A | * | 8/1971 | Gardella .................... 193/35 R |
| 4,013,166 A | * | 3/1977 | Weady et al. ............... 198/835 |
| 4,082,180 A | * | 4/1978 | Chung ........................ 198/835 |
| 5,088,596 A | * | 2/1992 | Agnoff ....................... 198/788 |
| 5,143,184 A | | 9/1992 | Snyder et al. |
| 5,413,209 A | * | 5/1995 | Werner ....................... 198/500 |
| 5,442,248 A | * | 8/1995 | Agnoff ........................ 310/71 |
| 5,642,799 A | | 7/1997 | Warrilow |
| 5,732,813 A | * | 3/1998 | Nielsen et al. ............. 198/788 |
| 6,082,528 A | | 7/2000 | Habberley |
| 6,419,070 B1 | * | 7/2002 | Agnoff ........................ 193/37 |
| 6,443,295 B1 | * | 9/2002 | Hill ............................ 198/788 |
| 6,612,422 B2 | * | 9/2003 | Roberts et al. ............. 198/788 |
| 6,755,299 B2 | * | 6/2004 | Itoh et al. ................... 198/780 |
| 7,207,433 B2 | * | 4/2007 | Schaefer ..................... 198/788 |
| 2006/0151299 A1 | * | 7/2006 | Schaefer ..................... 198/788 |

FOREIGN PATENT DOCUMENTS

| | | |
|---|---|---|
| CA | 2 177 797 C | 12/1996 |
| DE | 3215921 A * | 11/1983 |
| WO | WO 03/008307 A1 | 1/2003 |

\* cited by examiner

*Primary Examiner*—Gene Crawford
*Assistant Examiner*—Leslie A Nicholson, III
(74) *Attorney, Agent, or Firm*—Hoffman & Baron, LLP

(57) ABSTRACT

A motorized conveyor roller having a rotatable portion and at least one non-rotatable portion; including a method of inhibiting contact with a motorized rotatable conveyor roller that drives a conveyor roller that drives a conveyor medium.

10 Claims, 1 Drawing Sheet

MOTORIZED DRUM ROLLER WITH STATIONARY ENDS

FIELD OF INVENTION

This invention relates to motorized conveyor rollers and particularly relates to a motorized conveyor roller having a rotatable portion disposed between two opposite stationary ends. The invention also relates to the method of barring access to a motorized rotatable conveyor roller for driving a conveyor medium by disposing the motorized rotatable conveyor rollers between opposed generally cylindrical stationary ends.

BACKGROUND ART

A variety of conveyor roller systems have heretofore been designed and utilized. A large variety of known conveyor roller systems comprise a continuous belt or conveyor medium which travels over a series of rollers. The rollers can be simple shafts on which may be mounted various forms of sprockets or drive means for supporting the conveyor medium. Some advanced conveyor systems utilize enclosed and sealed drive rollers with the drive motors contained inside the rollers themselves.

An example of such motorized conveyor roller is disclosed in U.S. Pat. No. 5,088,596 which teaches a motorized conveyor roller mounted in a conveyer frame to support and propel articles from one end of the conveyor path towards the opposite end. The conveyer roller includes a roller tube rotatably mounted in the conveyor frame and drive means contained inside the roller tube for driving the roller tube. The drive means includes a motor, a gear reducer assembly operatively connected to the motor, and a drive member connected to the outward shaft of the speed reducer for engaging and rotating the roller tube.

Furthermore there has been a concern by some to improve the safety features of conveyor rollers and particularly motorized conveyor rollers. For example, U.S. Pat. No. 5,642,799 illustrates a brake device for a conveyor having two load supporting conveyor rollers rotatable to engage a load thereon to be transported along the conveyor. The load supporting rollers are movably transversely to their axis of rotation by a load passing there over against a resilient bias into engagement with a brake roller adapted to brake rotation of the conveyor rollers.

Moreover U.S. Pat. No. 5,143,184 illustrates a safety shutdown system for luggage conveyor systems.

Furthermore U.S. Pat. No. 6,082,528 teaches a conveyor roller.

There is, however, a need to improve the safety features of motorized conveyor rollers.

It is a further object of this invention to provide an improved motorized conveyor roller and method thereof.

It is an aspect of this invention to provide a motorized conveyor roller having a rotatable portion and at least one stationary end.

DISCLOSURE OF INVENTION

It is a further aspect of this invention to provide a motorized conveyor roller for supporting and driving a conveyor medium comprising a hollow drum defining a rotatable supporting surface having a cylindrical shape disposed between said first and second generally cylindrical stationary ends; said first and second generally cylindrical stationary ends co-axially mounted to first and second spaced apart stationary shafts respectively; one end of each of said stationary shafts disposed internally of said hollow drum for carrying drive means for rotating said hollow drum between said generally cylindrical stationary ends.

It is yet a further aspect of this invention to provide a method of barring access to a motorized rotatable conveyor roller for driving a conveyor medium by disposing said motorized rotatable conveyor roller between opposed generally cylindrical stationary ends.

These and other objects and features of the invention shall now be described in relation to the following drawings.

BEST MODE FOR CARRYING OUT THE INVENTION

Figure 1:
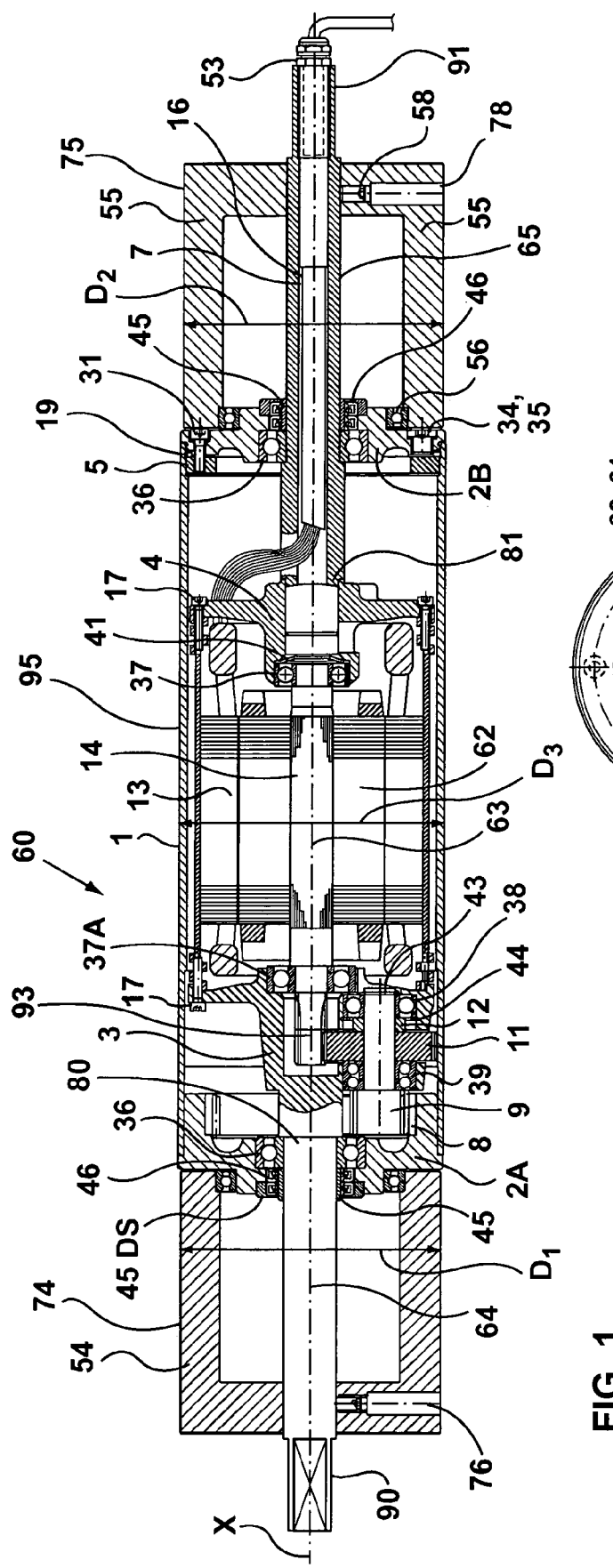
FIG. 1 is a full cross-sectional view of a motorized conveyor roller.

In the description, which follows, like parts are marked throughout the specification and the drawings with the same respective reference numerals. The drawings are not necessarily to scale and in some instances proportions may have been exaggerated in order to more clearly depict certain features of the invention.

FIG. 1 generally illustrates the motorized conveyor roller 60 having a rotatable portion, hollow drum, a roller tube 1. The rotatable portion 1 is disposed between a first generally cylindrical stationary end or portion 54 and a second generally cylindrical stationary end or portion 55. The first and second cylindrical stationary ends 54 and 55 define two opposite stationary ends 54 and 55.

The rotatable portion 1 comprises a rotatable displaceable roller tube as shown. The roller tube 1 includes a motor generally depicted as 62. The motor comprises a stator 13 and rotor 14. The rotor 14 defines a rotatable shaft 63 which is received by ball bearings 37 and 37A for rotation thereabouts.

More specifically each of the stationary ends 54 and 55 are co-axially disposed about a first stationary shaft 64 and a second stationary shaft 65 as shown in FIG. 1. First and second stationary shafts 64 and 65 are co-axially disposed with rotatable shaft 63 about an axis X. First stationary shaft 64, second stationary shaft 65 and rotatable shaft 63 define a central axis X.

In other words the first and second spaced stationary shafts 64 and 65 carry the two stationary ends 54 and 55 respectively. Each of the stationary ends present a generally cylindrical surface 74 and 75 presenting an outer diameter $D_1$, $D_2$ respectively. Furthermore each of the first and second stationary ends 54 and 55 are secured to the stationary shafts 64 and 65 by a variety of means including socket headset screws 58 located in set screw holes 76 and 78 as shown. Alternate securing means can be used to secure the first and second stationary ends 54 and 55 to the stationary shafts 64 and 65 such as keyways, friction fit splines, adhesive and the like.

Furthermore the rotatable shaft 63 is carried by the motor 62.

The hollow drum 1 defines a rotatable supporting surface having the cylindrical shape as shown disposed between the first and second generally cylindrical stationary ends 54 and 55. One end 80 and 81 of each of the stationary shafts 64 and 65 respectively are disposed internally of the hollow drum 1 for carrying the drive means which consists of the motor 62 for rotating the hollow drum 1 between the generally cylindrical stationary ends 54 and 55.

More specifically the second shaft 65 comprises a hollow shaft 7 having a cable passage 16 for receiving an electrical cable electrically connected to the motor 62 as shown. One end of the hollow drum 1 includes an end flange 2A while the other end of the hollow drum 1 includes end flange 2B. Both end flanges 2A and 2B are press fit or connected to the outer shell of the hollow drum 1.

End flange 2A includes a double seal adapter 45DS and oil seal 46 as well as bearing rings 45. Furthermore ball bearings 36 are also associated with end flange 2A.

Moreover end flange 2B includes ball bearings 36, a mounting ring 5 and spring ring 19. A filler plug 34 and washer 35 are also disclosed. A socket head cap screw 31 is utilized to secure the end flange 2B to the mounting ring 5 and spring ring 19 together. Furthermore bearing race 45 and oil seal 46 with bearings 56 are shown.

Figure 2:
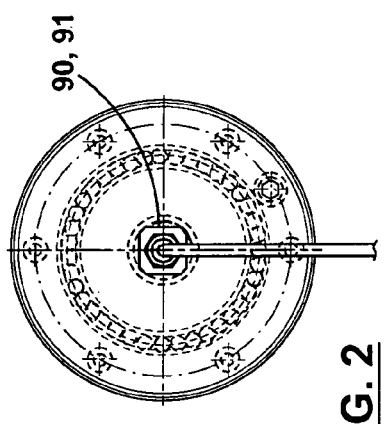
FIG. 2 is an end view of FIG. 1.

The other ends 90 and 91 of stationary shafts 64 and 65 have a cross-section which permits the other ends 90 and 91 of the first and second stationary shafts 64 and 65 to be held by a shaft holder or the like that will register with the square cross-section for positive securement. In FIG. 2 the other end 90 and 91 presents a generally square cross-section so as to prevent rotation of the stationary shafts 64 and 65. The other end 91 of second stationary shaft 65 illustrates a PG9 connector 53.

Moreover one end 80 of fixed shaft 64 presents a gear housing 3. One end 81 of the second shaft 65 presents a motor flange 4. Furthermore locking disk 41 is disposed in the vicinity of the motor flange 4. Each of the gear housing 3 and motor flange 4 present ball bearings 37 and 37A respectively which permit free rotation of the rotor or rotational shaft 14. The ends of gear housing 3 and motor flange 4 present securing means 17 to secure the stator 13 thereto as shown. More specifically the securing means 17 comprises in one example socket head cap screws as shown.

The rotatable shaft 63 which defines the rotor 14 has at one end thereof a pinion 93 for rotational engagement with gear 11. Gear 11 is press fit to second pinion 9 which rotationally engages internal gear 8. The internal gear 8 is presented by end flange 2A thereby causing the hollow shell 1 to rotate about the stator 13. The assembly further includes a distance ring 12 as shown. Moreover snap ring 44, ball bearings 38 and snap ring 43 are shown.

The outer surface 95 of hollow drum 1 presents an outer diameter $D_3$ which is slightly greater than the diameter of each of the generally cylindrical stationary ends $D_1$ and $D_2$. Therefore a conveyor medium (not shown) will be driven by the outer surface 95 of the rotatable portion 1 rather than the outer surface 74 and 75 of first and second stationary ends 54 and 55, since outer surface 95 is slightly raised. Furthermore the outer surface 95 can include by knurling or machining a spiral at each end toward the center or by covering the outer surface 95 with rubber so as to increase the co-efficient of friction between the surface 95 and conveyor.

Furthermore the gear 11, second pinion 9 and internal gear 8 define gear means which is driven by the first pinion 93.

The invention described herein defines a method of barring access to a motorized rotatable conveyor roller 1 which drives a conveyor medium by disposing the motorized rotatable conveyor roller 1 between opposed generally cylindrical stationary ends 54 and 55.

Accordingly if someone near the conveyor system accidentally touches the end of the motorized conveyor roller 60, they will come into contact with the stationary ends 54 and 55 thereby preventing any damage which may otherwise occur where a person would come in contact with rotating parts which may cause physical damage or catch any loose clothing drawing a person into the system.

Furthermore the invention described herein can be utilized to retrofit existing motorized conveyor rollers having one end 90 and 91 of first and second stationary shafts 64 and 65 which are long enough to accommodate the addition of a stationary ends 54 and 55 thereto. In other words, stationary ends 54 and 55 may comprise of adapters which are sufficiently sized so as to enable one to attach the first and second stationary ends to the shafts 64 and 65 by utilizing securing means 58 as shown.

Moreover although the stationary ends 54 and 55 are shown as secured to the first and second stationary shafts 64 and 65 it is possible to include appropriate grooves within the shafts 64 and 65 to receive C-washers that would retain the stationary ends there between.

Typically there is a small gap between the ends of the first and second stationary ends 54 and 55 and end flange 2A and end flange 2B. For example, such gap may be in the vicinity of 0.04 inch although such example should not be interpreted as limiting but only as an example.

The invention described herein illustrates a rotatable roller having cylindrical ends disengaged from the rotational movement of the rotational roller.

Various embodiments of the invention have now been described in detail. Since changes in and/or additions to the above-described best mode may be made without departing from the nature, spirit or scope of the invention, the invention is not to be limited to said details.

I claim:

1. A motorized conveyor roller for moving a conveyor medium, said motorized conveyor roller comprising a rotatable portion adapted to engage said conveyor medium intermediate a first and second non-rotatable hollow tube, each said non-rotatable hollow tube extending axially outward adjacent from said rotatable portion and wherein said non-rotatable hollow tubes have a diameter substantially the same as a diameter of said rotatable portion, said rotatable portion comprises a rotatable roller tube, including a motor for rotating said roller tube, and said hollow tubes have a radial end surface with said first and second hollow tubes axially disposed about a central shaft, wherein, said central shaft comprises a rotatable shaft portion disposed between said first and second hollow tubes, and wherein said roller tube contacts and moves said conveyor medium and said first and second hollow tubes are spaced from said conveyor medium.

2. A motorized conveyor roller as claimed in claim 1 further including first and second stationary shafts, said rotatable shaft portion disposed axially and intermediate said first and second stationary shafts wherein said first and second stationary shafts are fixedly secured to said first and second hollow tubes respectively.

3. A motorized conveyor roller as claimed in claim 2 wherein said rotatable shaft portion is carried by said motor.

4. A motorized conveyor roller as claimed in claim 3 wherein one end of said rotatable shaft portion presents a pinion for driving said rotatable roller tube.

5. A motorized conveyor roller as claimed in claim 4 wherein each of said hollow tubes cover the ends of said rotatable portion, respectively so as to inhibit contacting said rotatable portion when said rotatable portion drives a conveyor medium.

6. A motorized conveyor roller as claimed in claim 5 wherein each radial end surface is non-rotating.

7. A conveyor system as claimed in claim 6 wherein said stationary ends bar access to said rotatable roller tube when said stationary ends are accidentally contacted.

8. A motorized conveyor roller for supporting and driving a conveyor medium comprising:
- (a) a hollow drum defining a rotatable supporting surface having a cylindrical shape disposed between a first and second non-rotating hollow tube spaced axially outwardly from said rotatable support surface, said hollow tubes having an outer diameter substantially the same as a diameter of said rotatable supporting surface, wherein said outer diameter of said hollow drum drives said conveyor medium, and said outer diameter of said hollow tubes do not contact said conveyor medium;
- (b) said first and second generally non-rotating hollow tubes co-axially secured to first and second spaced apart stationary shafts respectively, wherein each said hollow tube includes a radial end for receiving said first and second spaced apart stationary shafts respectively, and said radial ends are stationary; and
- (c) one end of each of said stationary shafts disposed internally of said hollow drum for carrying a driving means for rotating said hollow drum between said first and second spaced apart stationary shafts, wherein said hollow drum includes a rotating shaft co-axially disposed between said stationary shafts.

9. A motorized conveyor roller as claimed in claim 8 wherein said hollow drum presents a first end flange and a second end flange; and roller bearing means disposed between said first and second end flanges and said first and second hollow tubes respectively.

10. A motorized conveyor roller as claimed in claim 9 wherein said first and second hollow tubes are axially spaced from said first and second flanges.

\* \* \* \* \*